Feb. 7, 1956  H. E. SCHMIDT  2,733,617
STEERING ATTACHMENT FOR AUTOMOBILE STEERING WHEELS
Filed Nov. 17, 1954
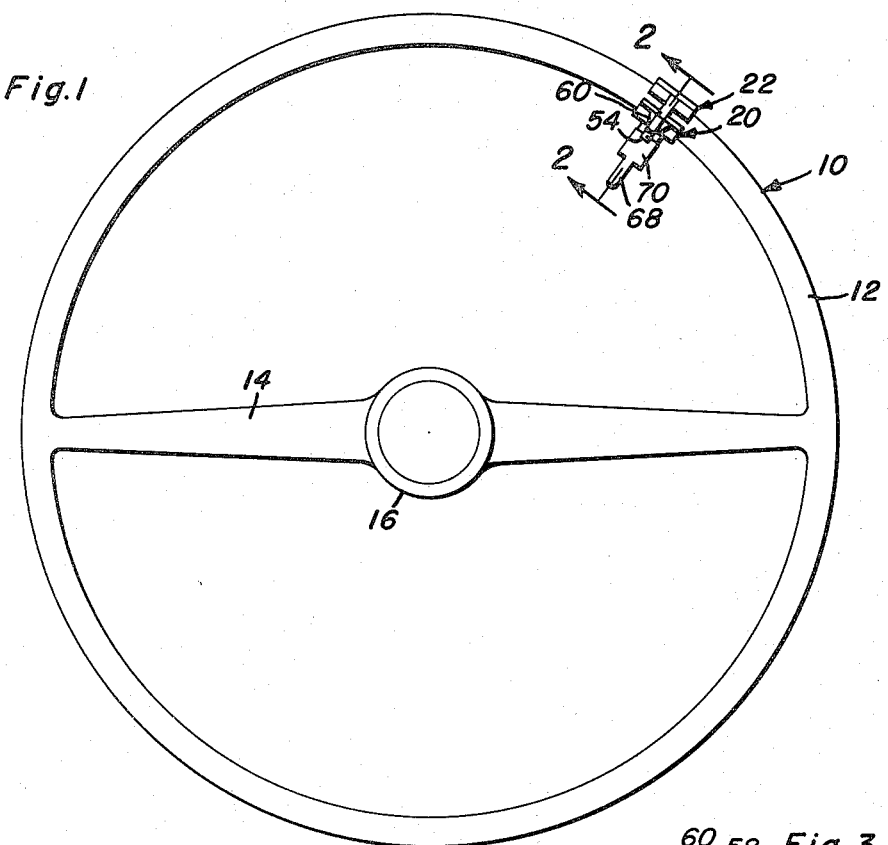
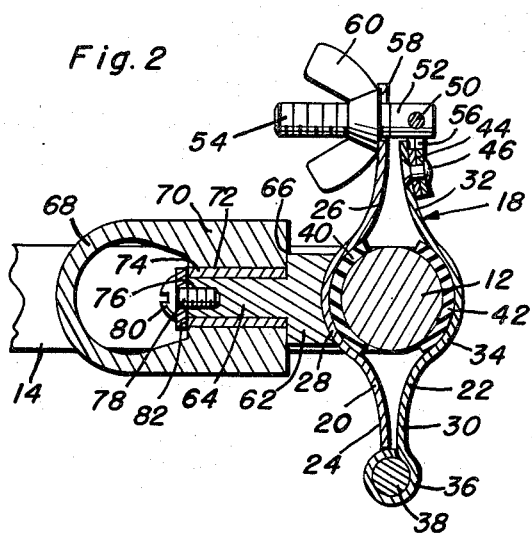
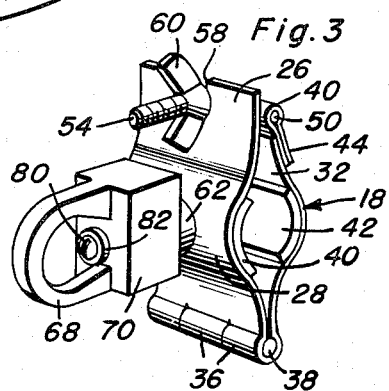
INVENTOR
*Hugo E. Schmidt*
BY *Frank C. Maley*
AGENT

United States Patent Office 2,733,617
Patented Feb. 7, 1956

2,733,617

STEERING ATTACHMENT FOR AUTOMOBILE STEERING WHEELS

Hugo Eugene Schmidt, Tuckahoe, N. Y.

Application November 17, 1954, Serial No. 469,405

1 Claim. (Cl. 74—557)

This invention relates to improvements in devices for operating a steering wheel of an automobile and is particularly directed to a steering attachment for use by persons having a prosthetic substitute, such as a hook for a natural arm.

Steering aids for this general purpose have been provided heretofore for enabling persons having an artificial hook to turn the steering wheel. However, such aids are not easily attached to and detached from the steering wheel; such ease of attachment and detachment being highly desirable to enable the device to be relocated for convenience of the operator and to be removed so as to enable the wheel to be safely operated in a normal manner by a person with natural hands. Further, such devices extend in offset fashion from the ring section of the wheel and cannot project radially directly from the ring section. Such direct radial projection is highly desirable for ease and safety in operation.

The primary object of the present invention is to provide a steering aid which includes a rotatable hook receiving member that is carried by one plate of a hinge unit, the unit including a pair of hingedly connected plates which have an attached fastening means that clamps them on the ring section of the wheel in such a manner that the hook receiving member radially extends directly inwardly from the ring section of the wheel and lies in the same plane as the cross spokes and the center ring section of the wheel.

Another object of this invention is to provide a swivelly attached bolt which is carried by the free end of one plate and is swung into an end slot in the other plate and has a wing nut or other suitable fastener that clamps the plates tightly together. Such fastening assembly ensures easy attachment and detachment with only one hand and ensures against loss of parts or accidental dislocation thereof or of the unit.

A further object of this invention is to provide a compact, inexpensive and durable steering aid.

The foregoing and allied objects are attained by this invention, the preferred embodiment of which is set forth in the following description and illustrated in the accompanying drawing, wherein:

Fig. 1 is a top plan view of an orthodox steering wheel to which a steering aid, constructed in accordance with this invention, is attached;

Fig. 2 is a longitudinal sectional view of the steering aid and is taken on line 2—2 of Fig. 1, and Fig. 3 is a perspective view of the steering aid.

Referring now more particularly to the drawing, the numeral 10 generally designates an orthodox automobile steering wheel which includes a rim or ring 12 supported by a pair of aligned spokes 14 which radiate from a center hub 16 that is suitably attached to the steering shaft. A steering aid 18, constructed in accordance with this invention is attached to the ring 12.

The steering aid includes a pair of complemental plates 20 and 22, which are coextensive in width and substantially coextensive in length. The plates are identically configured and the plate 20 has substantially flat outer ends 24 and 26 and a concave or arcuate center section 28 while the plate 22 has substantially flat outer ends 30 and 32 and a concave or arcuate center section 34. The adjoining extremities of the ends 24 and 30 are bent into interfitting hinge knuckles 36 which are aligned to receive a hinge pin 38 about which the plates swing to open and closed positions. The plates have inner confronting faces which are concaved at the center sections to form a circular opening that receives the ring 12 which is round in cross-section. The inner, confronting faces of the center sections have arcuate resilient pads 40 and 42 suitably superimposed thereon and provided to grip the wheel and locate the plates in set positions on the wheel. The pads prevent slippage of the steering aid and positively locate it against rotation or sliding movement along the circumference of the wheel.

The end 32 of the plate 22 has a U-shaped extension 44 suitably secured as by rivets 46 to the outer face thereof. The legs of the extension are secured flat to the face of the end 32 while the web portion 48 is tubular and is disposed transversely at the outer extremity of the end to form a tubular bearing sleeve. A pin 50 is rotatably journalled in the tubular portion or sleeve 48 and carries the head 52 of a bolt 54. The bolt 54 is bodily rotatable from one face of the end to the other due to the rotation of the pin but the bolt is fixed by the pin against rotation about its axis. The bolt is mounted by the pin to swing about an axis transverse to the plate and from a position horizontal to the plate to one perpendicular thereto in clamping the plates together. The tubular portion is slotted, as at 56, to permit the bolt to swing to a perpendicular position.

The end 26 of the plate 20 is formed with an axial slot 58 which extends through the extremity thereof and receives the bolt 54. The bolt is threaded to receive a wing nut 60 which clampingly bears on the outer face of the end 26 and clamps the inner faces of the free ends 32 and 26 tightly together.

The outer face of the center section 28 of the plate 20 has a stud 62 outstanding laterally therefrom. The stud has a coaxially reduced outer bearing end 64 which forms an outwardly facing bearing shoulder 66 with the inner end thereof. The inner end of the stud is welded or otherwise suitably attached to the outer face of the center section.

A hook receiving member having an eye 68 is provided and includes a base portion 70 which has an axial bore 72 that radially opens into the eye 68. A brass bushing 74 is press fitted in the bore and rotatably disposed on the outer end of the stud. The inner end of the bushing rotatably bears on the shoulder 66. The bushing and base are coextensive in length with the outer end 64 of the stud and the outer extremity of the stud end 64 is formed with a threaded tapped hole 76 that receives the shank of a screw 78, the head 80 of which overlies the bushing and is spaced therefrom by a washer 82.

It will be noted that the stud 62 radially extends from the ring, as shown in Fig. 2, with the center section of the plate 20 overlying a portion of the circumference of the ring and that the hook receiving member radiates from the ring and lies in the same plane therewith and with the spokes.

The base portion 70 is freely rotatable on the stud and friction drag is entirely prevented by the bushing.

The hinged ends of the plates retain the plates together and the swivelled bolt permits the plates to be clamped on the ring with one hand and to be easily detached without any possible loss of parts. Thus, the device can be carried in the pocket and attached to any automobile and then removed therefrom.

While the preferred embodiment of this invention has

What is claimed:

A steering aid for attachment to the rim of a steering wheel for gripping by persons with prosthetic hook substitutes for natural hands, said steering aid comprising a pair of complemental plates disposed in face to face relation and having a first pair of adjoining ends hingedly connected together and a second pair of adjoining free ends, said plates being swingable about their hinged ends into face to face confronting relationship and having confronting concave center sections adapted to receive a wheel rim to mount the plates on the rim, a tubular bearing sleeve fixed transversely on the free end of one of the plates, a pin rotatably journalled in the sleeve, said sleeve having a cut-out, a bolt having a transverse opening receiving the pin, said bolt being movable in the cut-out and bodily swingable relative to the other plate, the free end of said other plate having an axial slot extending through the end edge for receiving the bolt, a wing nut threaded on the bolt to clamp the free ends of the plates together, a stud outstanding from the center section of one of the plates, a block member having an axial bore receiving the stud, a bushing press-fitted in the bore and rotatably circumposed on the stud, said stud having an outer end formed with a threaded bore, a screw threaded in the bore to lock the block member on the stud and an integral eye on the outer end of the block member.

References Cited in the file of this patent

UNITED STATES PATENTS

| | | |
|---|---|---|
| 1,620,223 | Norcross | Mar. 8, 1927 |
| 1,735,783 | Oliver, Sr. | Nov. 12, 1929 |
| 2,475,858 | Riemann | July 12, 1949 |

OTHER REFERENCES

Publication: Popular Mechanics, page 9, Sept. 1945.